United States Patent
Ulbricht et al.

(10) Patent No.: US 9,602,588 B2
(45) Date of Patent: Mar. 21, 2017

(54) TRANSMISSION OF DATA STREAMS BETWEEN A TERMINAL DEVICE AND A SECURITY MODULE

(71) Applicant: GIESECKE & DEVRIENT GMBH, Munich (DE)

(72) Inventors: Thorsten Ulbricht, Munich (DE); Huy Pham Nguyen, Munich (DE); Georg Kramposthuber, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 191 days.

(21) Appl. No.: 14/378,801

(22) PCT Filed: Jan. 8, 2013

(86) PCT No.: PCT/EP2013/000032
§ 371 (c)(1),
(2) Date: Aug. 14, 2014

(87) PCT Pub. No.: WO2013/120569
PCT Pub. Date: Aug. 22, 2013

(65) Prior Publication Data
US 2015/0074236 A1 Mar. 12, 2015

(30) Foreign Application Priority Data

Feb. 15, 2012 (DE) .......... 10 2012 003 009

(51) Int. Cl.
G06F 15/16 (2006.01)
H04L 29/08 (2006.01)
H04L 29/06 (2006.01)

(52) U.S. Cl.
CPC .......... *H04L 67/10* (2013.01); *H04L 63/0471* (2013.01); *H04L 63/0853* (2013.01);
(Continued)

(58) Field of Classification Search
CPC ............ H04L 63/0853; H04L 63/0428; H04L 63/0471
See application file for complete search history.

(56) References Cited

U.S. PATENT DOCUMENTS 7,047,558 B1 * 5/2006 Mariana .............. H04L 63/0853
725/6
7,469,343 B2 12/2008 Ray et al.
(Continued)

FOREIGN PATENT DOCUMENTS

| DE | 20 2007 002971 U1 | 6/2007 |
|----|---|---|
| EP | 1473617 A2 | 11/2004 |
| EP | 1679620 A1 | 7/2006 |

OTHER PUBLICATIONS

Rees, Jim and Peter Honeyman, "Webcard: a Java Card Web Server", http://citeseerx.ist.psu.edu/viewdoc/summary?doi=10.1.1.37.3014, Published: 1999, Accessed Apr. 13, 2016.*
(Continued)

*Primary Examiner* — Nam Tran
(74) *Attorney, Agent, or Firm* — Workman Nydegger

(57) ABSTRACT

In a method for transmitting data streams between a terminal device and a portable security module having a web server, the security module receives a first request announcing a processing data stream, and a second request containing the processing data stream. The security module generates a result data stream on the basis of already received data of the processing data stream during the receipt of the processing data stream, and sends a first response to the first request while the result data stream is being generated, wherein the first response contains the result data stream. Given the limited memory of the security module, it is thereby made possible to process larger data streams nevertheless.

13 Claims, 3 Drawing Sheets

(52) U.S. Cl.
CPC .......... *H04L 65/60* (2013.01); *H04L 63/0428* (2013.01); *H04L 67/02* (2013.01)

(56) References Cited

U.S. PATENT DOCUMENTS

| | | |
|---|---|---|
| 7,526,801 B2 | 4/2009 | Ballinger et al. |
| 2002/0138549 A1* | 9/2002 | Urien .................. H04L 63/0853 709/202 |
| 2004/0250087 A1 | 12/2004 | Ray et al. |
| 2005/0120125 A1* | 6/2005 | Morten ............... H04L 63/0853 709/231 |
| 2006/0236387 A1 | 10/2006 | Ballinger et al. |
| 2009/0119364 A1 | 5/2009 | Guillon |
| 2010/0057918 A1 | 3/2010 | Riemers |
| 2010/0318667 A1 | 12/2010 | Miller et al. |
| 2011/0246609 A1* | 10/2011 | Kim ........................ H04L 67/02 709/217 |
| 2011/0298585 A1* | 12/2011 | Barry ..................... G06F 21/32 340/5.84 |
| 2012/0185561 A1* | 7/2012 | Klein ..................... H04L 67/02 709/217 |

OTHER PUBLICATIONS

German Examination Report for corresponding German Application No. 10 2012 003 009.6, Oct. 12, 2012.
International Search Report from corresponding International PCT Application No. PCT/EP2013/000032, Mar. 22, 2013.

\* cited by examiner

TRANSMISSION OF DATA STREAMS BETWEEN A TERMINAL DEVICE AND A SECURITY MODULE

BACKGROUND

The invention relates generally to the technical field of data communication and more specifically to the field of transmission of data streams to and from a security module. A security module in the diction of the present document can for example have the construction form of a chip card (smart card) or of a compact chip module or of a USB data carrier.

A preferred field of application of security modules is the encryption and decryption or the signing of data. The communication of a terminal device with the security module can take place via a web server realized in the security module, the web server being configured according to the "Java Card 3.0" specification for example. The terminal device sends requests—for example HTTP requests—to the security module and receives associated responses—for example HTTP responses.

The application protocols typically provided for a web server—for example HTTP or its secured variant HTTPS—allow responding to a request only if the request has been received in its entirety. Therefore the data to be processed and/or the generated result data must be intermediately stored in their entirety. Since memory space is frequently scarce in security modules, this represents a considerable consumption of resources. Further, the maximum size of the data to be processed is limited by the memory space available for the intermediate storing, even if the processing procedure itself—for example an encryption or decryption—could be carried out block by block without complete intermediate storage. Even if sufficient memory space were present in the security module, a complete intermediate storage leads to undesirably long reaction times.

EP 1 679 620 A1 shows a method for responding to an HTTP request in several parts. An HTTP request is regarded as open for such a time until it has been responded to completely by means of several HTTP responses. However, there exists the difficulty that this method is an extension of the HTTP standard that cannot be implemented offhand with conventional components—e.g. conventional web browsers.

SUMMARY

The object of the invention is to make available an approach for processing data in a security module that requires only a relatively small memory space even for extensive amounts of data. In preferred embodiments the invention is to permit the utilization of terminal devices with conventional web browsers for communication with the security module.

The basic idea of the invention is to send a first and a second request to the security module for the purpose of transmitting the data to be processed. The second request contains the processing data stream, while the first request announces this data stream. The receipt of the first request gives the security module the opportunity to respond immediately to the first request and to transfer the result data stream to the terminal device in this response. In contrast, the response to the second request is merely optional. In other words, it is an important aspect of the present invention that the result data stream is transmitted exactly not in the response taking place in reaction to the request with the processing data stream. In this fashion, the invention overcomes the limitation present in the state of the art that in a request/response pair, the response can be generated only when the request has been received in its entirety.

The invention offers the substantial advantage that the length of the transmitted data streams is not limited by the memory space available in the security module. Further, in preferred embodiments the communication between the terminal device and the security module can correspond to conventional application protocols—for example HTTP or its secured variant HTTPS—, so that in the terminal device a conventional web browser can be used without changes or with merely minor changes. However, this does not rule out that in some embodiments extensions of the web browser—e.g. plug-ins—or even application programs independent of the web browser are utilized for communication with the security module.

Preferably, the sending of the first response with the result data stream starts chronologically before the end of receipt of the second request with the processing data stream. In particular, it is provided in some embodiments that the processing data stream is processed in sections, and that parts of the result data stream are sent successively, as soon as they are respectively available in the security module.

In some embodiments the communication between the terminal device and the security module is based on the hypertext transfer protocol (HTTP), which is understood to also encompass the secured variant HTTPS in the present document. The invention is not tied to a specific version of the HTTP protocol; in particular, HTTP/1.1 or HTTP/1.0 can be used.

In different embodiments the security module can recognize and distinguish the two requests in different ways. For example, these requests can be directed to different addresses (different host specifications and/or different path specifications and/or different further query parameters). In the context of HTTP here an address is understood as the URL in some embodiments. It is provided in some embodiments that the security module communicates the two addresses to the terminal device in reaction to a preparatory request. Alternatively or additionally the two requests can be recognized and distinguished on the basis of their message types or their useful data.

In some embodiments the security module makes available services for the encryption of data and/or for the decryption of data and/or for signing data and/or other services. The desired service can be addressed for example by utilizing different addresses or by a service-dependent coding of the data. The data to be processed by the security module can be for example documents or voice data or media data. The aspect of the relatively short reaction time is relevant particularly in real-time applications such as encryption and decryption processes during the transmission of media data. Such media data can be voice data (secure voice) or other audio data or video data in particular.

The computer program product can have program commands on a physical or a non-physical data carrier, which can for example be utilized in the manufacture or initialization of a security module according to the invention. Such a data carrier can be e.g. a CD ROM or a semiconductor memory or a signal transferred via a computer network.

BRIEF DESCRIPTION OF THE DRAWINGS

Further features, advantages and objects of the invention are indicated in the following exact description of several exemplary embodiments. Reference is made to the figures, wherein there is shown.

DETAILED DESCRIPTION OF VARIOUS EMBODIMENTS

Figure 1:
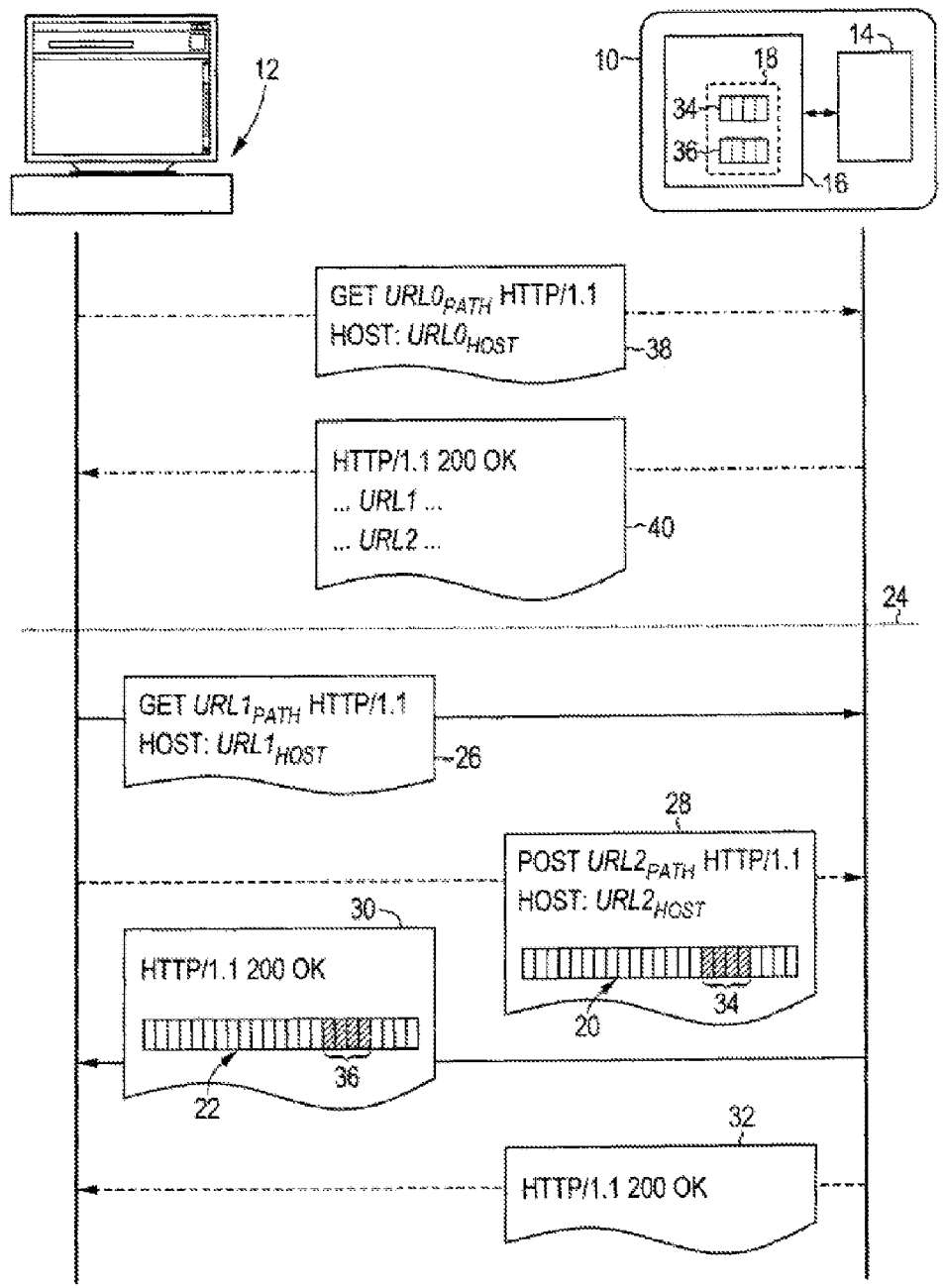
FIG. 1 a schematic representation of an exemplary embodiment of the invention during transmission of data streams between a terminal device and a security module, FIG. 2 a more exact representation of a part of the sequence of FIG. 1, and FIG. 3 a representation of steps of the method executed by the security module in the exemplary embodiment of FIG. 1.

FIG. 1 shows a system wherein a security module 10 and a terminal device 12 interact. The security module 10 is configured as a chip card or as a compact chip module—e.g. as a USB module—in the present exemplary embodiment. The terminal device 12 can be a personal computer for example, whereon a conventional web browser is executed. In alternative embodiments also a mobile device—e.g. a mobile telephone or a PDA—can be used as terminal device 12 with a corresponding web browser. The security module 10 is connected to the terminal device 12 for example via a USB interface or a chip card interface according to ISO/IEC 7814 or a radio interface—e.g. Bluetooth or WLAN.

The security module 10 has a processor 14 and a memory 16. The memory 16 is subdivided into several memory areas configured according to different technologies. Thus for example a region configured as a read-only memory or as a flash memory contains an operating system, a protocol stack, a web server and a processing program. The processing program makes available those functions that the terminal device 12 requests from the security module 10. In particular these functions can contain the encryption or decryption of data. Further, in a RAM area of the memory 16 a buffer memory 18 is configured, wherein incoming and outgoing data packets are intermediately stored.

The security module 10 is designed for receiving requests from the terminal device 12 and for sending responses to the terminal device 12. For this purpose the protocol predetermined by the interface between the security module 10 and the terminal device 12 is utilized on the physical level. On the higher levels, the protocols made available by the protocol stack of the security module 10 are used. In particular for the network and transport layer, a protocol is provided that can divide data into blocks upon transmission. Such a protocol can be e.g. TCP/IP or BIP (bearer independent protocol). The web server of the security module 10 implements the communication in the application layer, for example by means of HTTP or HTTPS.

In FIG. 1 an exemplary communication procedure is shown, according to which a user of the terminal device 12 transmits data to be processed in the form of a processing data stream 20 to the security module 10 via the web browser executed on the terminal device 12, and in turn receives a result data stream 22 from the security module 10. The data in the result data stream 22 are generated by the processing program of the security module 10 from the data of the processing data stream 20. For example the processing program can encrypt or decrypt the data in the processing data stream 20. However, both the processing data stream 20 and the result data stream 22 are so extensive that they could not be received in their entirety in the buffer memory 18.

The process stage shown in FIG. 1 below the line 24 will be explained first, where it is assumed that two addresses URL1 and URL2, to which the web server of the security module 10 is responsive, are known to the terminal device 12. In the exemplary embodiment described here each of the two addresses URL1 and URL2 is configured as a uniform resource designation (URL=uniform resource locator). In the way known in the art, an URL has a specification of the protocol to be utilized, a host specification, a path specification and optionally further components (e.g. a query string for transferring query parameters).

In the exemplary embodiment described here, HTTP or HTTPS is utilized as protocol, so that the protocol specification is "http:" or "https:". As host specification $URL1_{HOST}$ the first address URL1 contains a host name or a numerical IP address, at which the security module 10 is addressable by the terminal device 12. The same applies to the host specification $URL2_{HOST}$ of the second address URL2. As path specification the first address URL1 contains a first path specification $URL1_{PATH}$, and the second address URL2 contains a second path specification $URL2_{PATH}$ Each of the two path specifications has the syntax of a URL path according to the HTTP standard.

In many exemplary embodiments the two addresses URL1 and URL2 are different in the sense that their host specifications $URL1_{HOST}$, $URL2_{HOST}$ and/or their path specifications $URL1_{PATH}$, $URL2_{PATH}$ and/or further query parameters differ. However, as will be explained more exactly below, this is not compulsory.

In the exemplary embodiment described here the terminal device 12 directs a first request 26 as a GET request at the first address URL1. When the security module 10 is contactable in a private network at the IP address 192.168.0.2 and the path specification is "getdata", the first request 26 can be for example:

GET getdata HTTP/1.1
HOST: 192.168.0.2

For example due to the special host specification $URL1_{HOST}$ and/or due to the special path specification $URL1_{PATH}$, the security module interprets the incoming first request 26 as an announcement that the terminal device 12 will now send a second request 28 with a processing data stream 20.

Without waiting for a response to the first request 26, the web browser executed by the terminal device 12 now generates the second request 28. This second request 28 can be any type of request permitting a transfer of the processing data stream 20 to the security module 10. For example the second request 28 can have a HTTP POST method or a HTTP PUT method. For example the second request 28 can be as follows, if the same host specification is utilized as in the first request 26 and, for the purpose of distinction from the address URL1 of the first request 26, the path specification "postdata" is utilized:

POST postdata HTTP/1.1
HOST: 192.168.0.2
<processing data stream 20>

As a rule, the two requests are generated automatically by a supporting program (applet or plug-in) executed by the web browser of the terminal device 12, as soon as a user selects a certain function on a page displayed by the browser or a certain menu item of the browser. The supporting program can be for example a JavaScript program executed by the browser that is stored locally in the terminal device 12 or is loaded from an external address—for example the web server of the security module 10. However, also such configurations are provided where the user triggers the sending of the two requests 26, 28 manually, by first clicking on a link and then selecting and sending off in an input form a file to be sent as processing data stream 20.

In the present exemplary embodiment the security module 10 distinguishes the two requests 26, 28 on the basis of the different addresses URL1 and URL2, i.e. the different host specifications URL1$_{HOST}$, URL2$_{HOST}$ and/or path specifications URL1$_{PATH}$, URL2$_{PATH}$ and/or further query parameters. In other configurations the security module 10 can also recognize the two requests 26, 28 on the basis of the different HTTP methods, so that in this case identical addresses URL1 and URL2 can be utilized.

The web browser executed by the terminal device 12 sends the data to be processed to the security module 10 in the form of a processing data stream 20 in the message body of the second request 26. In the network and transport layer a protocol is utilized that transmits the extensive processing data stream 20 block by block. The processing data stream 20 is thus received successively by the security module 10 in the form of individual parts or blocks or packets. In FIG. 1 it is shown exemplarily that the security module 10 intermediately stores an incoming part 34 of the processing data stream 20 in the buffer memory 18.

During the still ongoing receipt of the processing data stream 20, the processor 14, controlled by the processing program present in the security module 10, starts processing at least a part of the already received processing data stream 20, thus for example starts encrypting or decrypting. The result data stream 22 thus arises during the still ongoing receipt of the processing data stream 20.

As soon as the security module 10 has generated at least a part of the result data stream 22, the security module 10 starts sending a first response 30 to the first request 26 already received in its entirety. The first response 30 in the exemplary embodiment described here according to the HTTP protocol consists of a status message in the message header, while the result data stream 22 is transferred in the message body:

HTTP/1.1 220 OK
<result data stream 22>

Like for the processing data stream 20, it is assumed in the present exemplary embodiment that the result data stream 22 is more extensive than the available space in the buffer memory 18 of the security module 10. Therefore respectively only a part 36 of the processing data stream 20 is stored in the buffer memory 18. These parts—e.g. the part 36—are transmitted successively in the first response 30. As already mentioned, the communication protocol underlying the transmission—e.g. TCP/IP or BIP—supports such a transmission of extensive messages in sections.

The security module 10 suitably manages the memory space available in the buffer memory 18. Thus the buffer memory 18 can be organized as a ring buffer having a single ring structure or two separate ring structures for the processing data and the result data. Alternatively, several firm memory areas for respectively one part 34, 36 can be provided in the buffer memory 18. The processing procedures executed by the security module 10 must of course be executable in sections on the processing data stream 20. In other words, the processing program executed by the security module 10 must be able to successively generate the result data stream 22, even if a part of the processing data stream 20 received so far was already overwritten again in the buffer memory 18. In total, the security module 10 is consequently able to process the processing data stream 20, even if the length of the latter is greater than the memory space available in the buffer memory 18.

The web browser executed by the terminal device 12 receives the result data stream 22 successively. For example these data can be represented in a browser window or can be stored in a file on the terminal device 12.

As soon as the result data stream 22 was sent in its entirety to the terminal device 12, the security module 10 sends a second response 32 to conclude the second request 28 according to the HTTP standard. The content of the second response can be for example:

HTTP/1.1 200 OK

In some embodiments additional contents can be transmitted in the second response 32, in particular status messages and/or error messages. However, the sending of the second response 32 can also be omitted completely, since the total information desired, namely the result data stream 22, was already transferred in the first response 30 to the first request 26.

Conceptually, the first pair of the first request 26 and the first response 30 is transmitted via a first channel between the terminal device 12 and the security module 10, and the second pair of the second request 28 and the second response 32 is transmitted via a second channel. In FIG. 1 the data transmission via the first channel is illustrated by means of continuous arrows, and the data transmission via the second channel is illustrated by means of dashed arrows. In the most general sense, a "channel" herein is to be understood as any communication path serving for the transfer of a pair of a request and the associated response. The first and the second channel can consequently run e.g. via a single TCP connection, if a correct allocation is ensured between each request 26, 28 and the associated response 30, 32. In many embodiments of the invention, however, an individual communication path of the transport layer—for example an individual TCP connection—is opened and closed and for each of the two channels.

The method described so far can be extended by a preparatory part wherein the security module 10 transfers the two addresses URL1 and URL2 to the terminal device 12. An exemplary embodiment of this preparatory part is illustrated in FIG. 1 by the separating line 24. The terminal device 12 here requests the addresses URL1 and URL2 from the security module 10 in a preparatory request 38. The preparatory request 38 is directed at an address URL0 that usually differs from the addresses URL1 and URL2. In particular, the address URL0 can be of a particularly simple structure, so that the user can enter this address directly in an address bar of the web browser executed on the terminal device 12. Such a simple address can be e.g. an empty path specification URL0$_{PATH}$="/", so that the preparatory request 38 to the security module 10 can be worded as follows for example:

GET/HTTP/1.1
HOST: 192.168.0.2

The web server of the security module 10 reacts to the preparatory request 38 by sending a preparatory response 40, with the first and second address URL1, URL2 contained in the message body of the latter. These preparatory communication steps 38, 40 offer the advantage that the two addresses URL1, URL2 do not need to be known beforehand, and can be re-determined for every new process sequence, if required.

In a particularly simple exemplary embodiment the preparatory response 40 can have HTML code causing the web browser of the terminal device 12 to display two buttons, by means of which the user can manually trigger the first and the second request 26, 28. However, it is more comfortable for the user if the preparatory response 40 contains program code—e.g. in Java script—that makes available a comfortable user interface and automatically controls the required communication processes with the security module 10. In other exemplary embodiments such a program code can have been loaded into the web browser of the terminal device 12 already beforehand, or can be executed in the form of a browser plug-in or of a separate application program on the terminal device 12. In this case the preparatory response 40 merely needs to contain the two addresses URL1, URL2 in a suitably coded form.

In exemplary embodiments where the process sequence is controlled by the terminal device 12 through program code—in the form of a separate application program or executed within the web browser—, the preparatory communication steps 38, 40 can be omitted, if required, if the information about the addresses URL1, URL2 is already contained in this program code.

Figure 2:
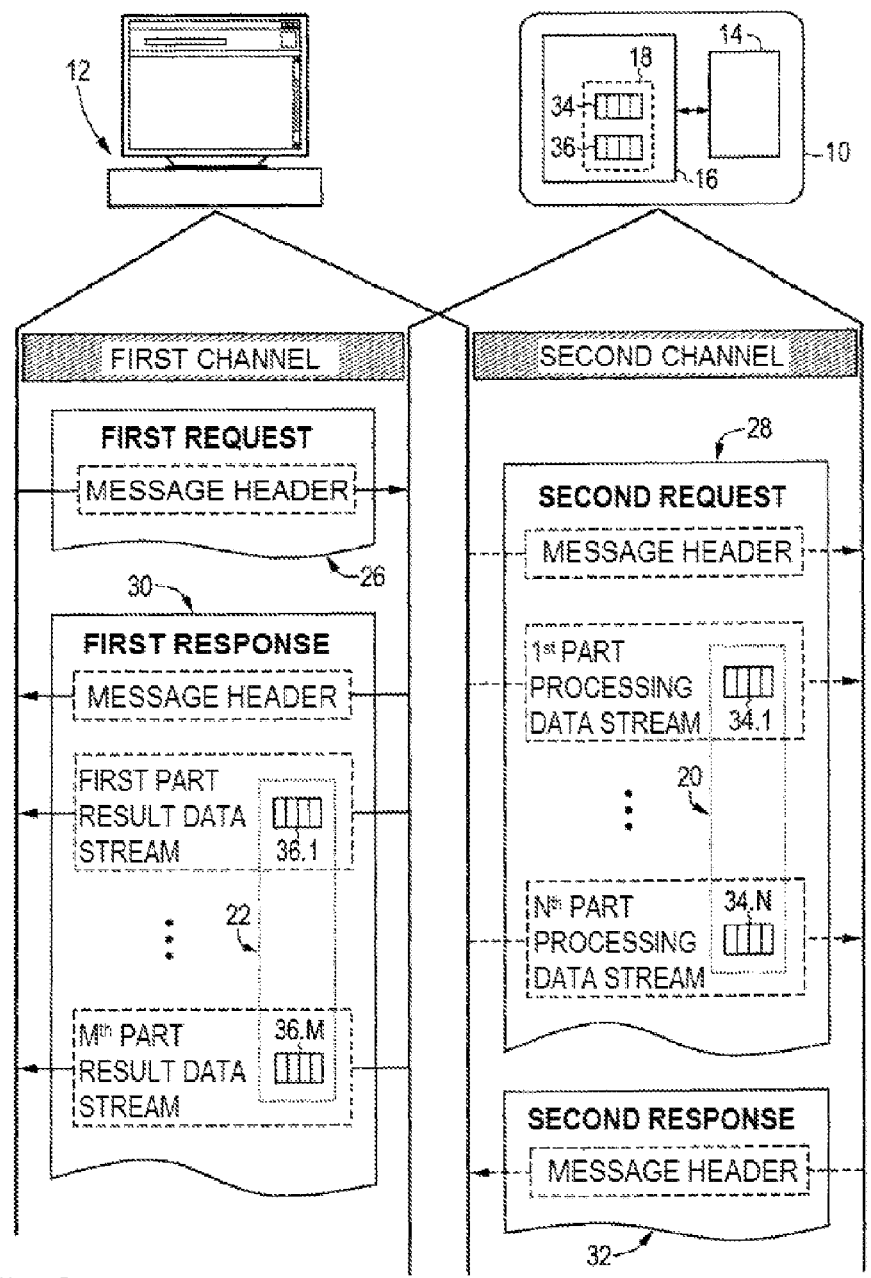

In FIG. 2 an example is illustrated for the chronological interlocking of the packet-by-packet transmission of the processing data stream 20 in the second request 28 and of the result data stream 22 in the first response 30. The parts of the connection data stream 20 bear the reference numbers 34.1 for the first part up to 34.N for the N$^{th}$ and last part. Correspondingly, the parts of the result data stream 22 bear the reference numbers 36.1 for the first part up to 36.M for the M$^{th}$ and last part.

What is important in the example shown in FIG. 2 is that the second request 28 chronologically overlaps with the first request 30, so that at least a part 36.1, . . . , 36.M of the result data stream 22 is sent before the last part 34.N of the processing data stream 20 has been received by the security module 10. In some embodiments a maximum offset is provided for this overlapping that can be determined at least also by the size of the buffer memory 18. For example the security module 10 can be so designed that the generation and transfer of result data relating to an incoming part 34.$i$ of the processing data stream 20 is concluded before the part 34.($i$+v) comes in, wherein the maximum offset v can amount for example to 1 or 2 or 4 or 8 or 16.

In FIG. 2 the message headers of the second request 28 and the first response 30 are shown separately from the respectively first parts 34.1 and 36.1, but it is understood that in some embodiments these message headers can also be transmitted in respectively one single data packet together with the respective first part 34.1 or 36.1.

Further, FIG. 2 again illustrates the utilization of two logical channels for transmitting the first request/response pair 26, 30 on the one hand and the second request/response pair 28, 32 on the other hand. As already mentioned, these channels can correspond to two different communication paths—e.g. two different TCP connections. In some embodiments the two channels must be understood purely conceptually, however, provided that the utilized communication path allows a parallel or interlocked transmission of the second request 28 and the first response 30.

Figure 3:
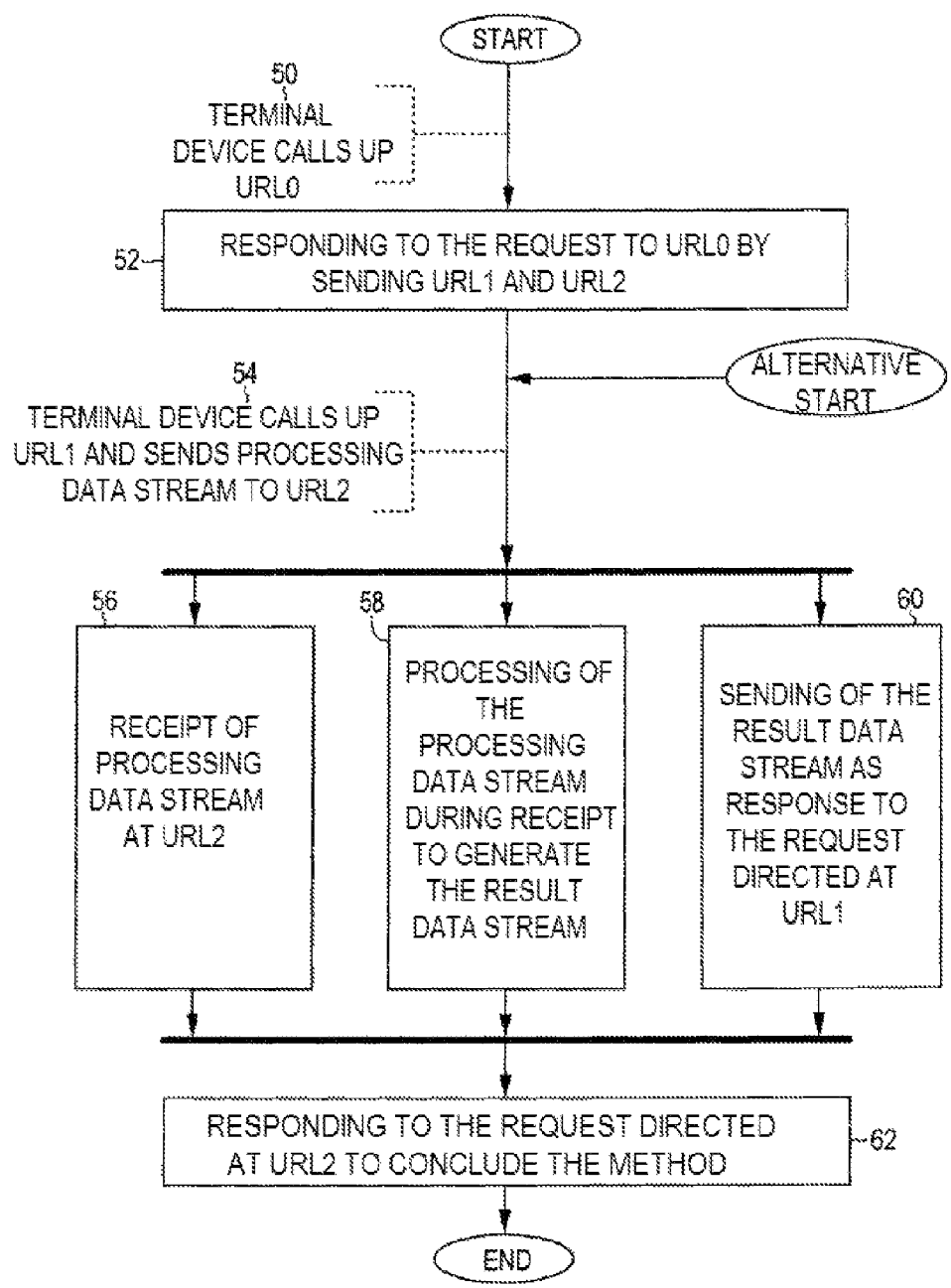

FIG. 3 again illustrates from the perspective of the security module 10 the sequence of the method 50 for transmitting and processing data that is described exemplarily here. The method starts in step 50 with the terminal device 12 calling up the address URL0 in the preparatory request 38. The security module 10 responds to this request 38 in step 52 by sending the preparatory response 40 containing the addresses URL1 and URL2. As illustrated by the symbol "alternative start", the steps 50 and 52 can be omitted if the addresses URL1 and URL2 are already known to the terminal device 12 for other reasons.

The terminal device 12 subsequently, in step 54, sends the first request 26 to the first address URL1 and the second request 28 to the second address URL2. The first request 26 announces the imminent transmission of the processing data stream 20, while the second request 28 contains this processing data stream 20. Further, the first request 26 makes it possible for the security module 10 to respond immediately with the first response 30 and to transfer the result data stream 22 successively to the terminal device 12 in the first response 30.

To respond to the first request 26 the security module 10 executes three steps 56, 58, 60 in parallel or concurrently or in an interlocked fashion. In step 56, the security module 10 first receives incoming parts 34.1, . . . , 34.N of the processing data stream 20 at the address URL2. In step 58 the security module 10 secondly processes the incoming data, successively generating the parts 36.1, . . . , 36.M of the result data stream 22. In step 60, the security module 10 thirdly sends every part 36.1, . . . , 36.M of the result data stream 22 in the first response 30, as soon as this part 36.1, . . . , 36.M is present respectively.

As soon as the result data stream 22 has been sent off to the terminal device 12 in its entirety, the first response 30 is finished. In a concluding, optional step 62 the security module 10 responds to the second request 28 with the second response 32 signaling the successful conclusion of the method.

It is evident that the embodiments and implementation variants described herein are to be regarded as mere examples. Further variants and combinations of the features described herein are directly apparent to the person skilled in the art.

The invention claimed is:

1. A method for transmitting data streams between a terminal device and a portable security module having a web server, wherein the method comprises the following steps executed by the portable security module utilizing the web server:
   receiving a first request announcing a processing data stream;
   receiving a second request containing the processing data stream;
   generating a result data stream on the basis of the already received data of the processing data stream during the receipt of the processing data stream;
   sending a first response to the first request during the generation of the result data stream, wherein the first response contains the result data stream.

2. The method according to claim 1, further containing:
   sending a second response to the second request after the end of sending of the result data stream, wherein the second response signals the conclusion of the method.

3. The method according to claim 1, wherein the communication between the terminal device and the portable security module is based on the hypertext transfer protocol (HTTP).

4. The method according to claim 1, wherein
   the first request contains an HTTP GET method;
   the second request contains an HTTP PUT method or an HTTP POST method; and
   the processing data stream is received in the message body of the second request, and the result data stream is sent in the message body of the first response.

5. The method according to claim 1, wherein the first and the second request contain respectively one address and that the portable security module is adapted to distinguish these requests at least partly on the basis of their addresses.

6. The method according to claim 5, wherein the portable security module receives a preparatory request utilizing the web server; and sends a preparatory response to the preparatory request, wherein the preparatory response contains a first address for the first request and a second address for the second request.

7. The method according to claim 1, wherein the start of sending of the first response takes place chronologically before the end of receiving the second request.

8. The method according to claim 1, wherein the portable security module has a buffer memory for intermediately storing data of the processing data stream and/or of the result data stream, wherein, during the sequence of the process, parts of the processing data stream and/or of the result data stream are continuously stored intermediately in the buffer memory and overwritten by subsequent parts, so that the length of the processing data stream and/Or of the result data stream that is maximally processable by the portable security module is greater than the capacity of the buffer memory.

9. The method according to claim 1, wherein the generating of the result data stream comprises an encryption or decryption of data of the processing data stream already received.

10. The method according to claim 1, wherein the portable security module is configured as a chip card or a chip module or a USB data carrier.

11. A portable security module having a processor and at least one memory, where the portable security module is adapted to execute a method according to claim 1.

12. A method for transmitting data streams between a terminal device having a web browser, and a portable security module, wherein the method comprises the following steps executed by the terminal device utilizing the web browser:

sending a first request announcing a processing data stream for the security module;

sending a second request containing the processing data stream;

receiving a first response to the first request during the sending of the processing data stream in the second request, wherein the first response contains a result data stream generated by the security module from the processing data stream.

13. The method according to claim 12, wherein the first request contains an HTTP GET method;

the second request contains an HTTP PUT method or an HTTP POST method; and the processing data stream is sent in the message body of the second request, and the result data stream is received in the message body of the first response.

* * * * *